United States Patent
Ponukumati et al.

(10) Patent No.: US 9,578,473 B1
(45) Date of Patent: Feb. 21, 2017

(54) DYNAMIC SUBSCRIPTION SELECTION FOR ENERGY EFFICIENT COMMERCIAL MOBILE ALERT SYSTEM/EARTHQUAKE TSUNAMI WARNING SYSTEM (CMAS/ETWS) RECEPTION

(71) Applicant: QUALCOMM Incorporated, San Diego, CA (US)

(72) Inventors: Dhananjaya Sarma Ponukumati, Hyderabad (IN); Bhanu Kiran Janga, Hyderabad (IN); Sitaramanjaneyulu Kanamarlapudi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/878,989

(22) Filed: Oct. 8, 2015

(51) Int. Cl.
*H04W 60/00* (2009.01)
*H04W 4/12* (2009.01)
*H04W 72/00* (2009.01)
*H04W 88/06* (2009.01)

(52) U.S. Cl.
CPC .......... *H04W 4/12* (2013.01); *H04W 72/005* (2013.01); *H04W 88/06* (2013.01)

(58) Field of Classification Search
CPC ....... H04W 4/16; H04W 4/001; H04W 48/12; H04W 60/04; H04W 60/005; H04B 1/3816

(Continued)

(56) References Cited

U.S. PATENT DOCUMENTS

2013/0150096 A1 6/2013 Hanchate et al.
2013/0303240 A1* 11/2013 Sanka ................. H04B 1/3816
455/558

(Continued)

FOREIGN PATENT DOCUMENTS

WO 2013012742 A2 1/2013

OTHER PUBLICATIONS

"3rd Generation Partnership Project; Technical Specification Group Core Network and Terminals, Technical realization of Cell Broadcast Service (CBS) (Release 13)", 3GPP Standard, 3GPP TS 23.041, 3rd Generation Partnership Project (3GPP), Mobile Competence Centre, 650, Route Lucioles. F-06921 Sophia-Antipolis Cedex, France,V13.1.0, Jun. 25, 2015 (Jun. 25, 2015), pp. 1-69, XP050966108.

(Continued)

*Primary Examiner* — Cong Tran
(74) *Attorney, Agent, or Firm* — Procopio, Cory, Hargreaves & Savitch LLP

(57) ABSTRACT

A method for selecting a subscription to receive cell broadcast service (CBS) messages for a multi-subscriber identity module (SIM) mobile communication device may include: camping on a first communication network with a first subscription; camping on a second communication network with a second subscription; determining whether system information blocks (SIBs) received on the first subscription and the second subscription contain information elements including one or more parameters that define a broadcast multicast control (BMC) scheduling message (SM) period; in response to determining that the SIBs received on at least one of the first subscription and the second subscription contain the information elements including the one or more parameters defining the BMC SM period, selecting the one of the first subscription and the second subscription associated with the SIBs containing the information elements to receive the CBS messages.

12 Claims, 3 Drawing Sheets

(58) Field of Classification Search
USPC ......... 455/558, 435.2, 435.3, 466, 557, 525, 455/428, 552.1
See application file for complete search history.

(56) References Cited

U.S. PATENT DOCUMENTS

| | | | |
|---|---|---|---|
| 2014/0078945 | A1 | 3/2014 | Schwartz et al. |
| 2014/0220924 | A1 | 8/2014 | Lee et al. |
| 2014/0247760 | A1 | 9/2014 | Telang et al. |
| 2014/0376429 | A1 | 12/2014 | Khay-Ibbat |
| 2015/0057046 | A1 | 2/2015 | Challa et al. |
| 2015/0099528 | A1* | 4/2015 | Hu ................ H04W 72/042 455/452.1 |
| 2015/0334584 | A1* | 11/2015 | Sun ................ H04W 24/02 455/67.11 |
| 2016/0050590 | A1* | 2/2016 | Ponukumati ....... H04B 17/309 455/437 |

OTHER PUBLICATIONS

"3rd Generation Partnership Project; Technical Specification Group GSM/EDGE Radio Access Network; Base Station Controller—Cell Broadcast Centre (BSC-CBC) interface specification; Cell Broadcast Service Protocol (CBSP) (Release 10)", 3GPP Standard; 3GPP TS 48.049, 3rd Generation Partnership Project (3GPP), Mobile Competence Centre; 650, Route Des Lucioles; F-06921 Sophia-Antipolis Cedex; France, No. V10.0.0, Mar. 25, 2011 (Mar. 25, 2011), pp. 1-55, XP050476540.

"3rd Generation Partnership Project; Technical Specification Group Radio Access Network; Broadcast/Multicast Control (BMC) (Release 12)", 3GPP Standard; 3GPP TS 25.324, 3rd Generation Partnership Project (3GPP), Mobile Competence Centre; 650, Route Des Lucioles; F-06921 Sophia-Antipolis Cedex; France, vol. RAN WG2, No. V12.0.0, Sep. 23, 2014 (Sep. 23, 2014), pp. 1-26, XP050925656.

3rd Generation Partnership Project; "Technical Specification Group Radio Access Network; Radio interface for broadcast/multicast services (Release 1999)", 3GPP Standard; 3GPP TR 25.925, 3rd Generation Partnership Project (3GPP), Mobile Competence Centre; 650, Route Des Lucioles; F-06921 Sophia-Antipolis Cedex ; France, No. V3.5.0, Dec. 1, 2004 (Dec. 1, 2004), pp. 1-31, XP050369423.

International Search Report and Written Opinion—PCT/US2016/056121—ISA/EPO—Dec. 12, 2016.

* cited by examiner

DYNAMIC SUBSCRIPTION SELECTION FOR ENERGY EFFICIENT COMMERCIAL MOBILE ALERT SYSTEM/EARTHQUAKE TSUNAMI WARNING SYSTEM (CMAS/ETWS) RECEPTION

BACKGROUND

Mobile communication devices have -discontinuous receive (non- DRX) and DRX modes of reception for over-the-air (OTA) transmission modes of cell broadcast service (CBS) messages for commercial mobile alert system/earthquake tsunami warning system (C,MAS/ETWS) in wideband code division multiple access (WCDMA) communication networks. When a subscription reselects or camps on a cell, in non-DRX mode the subscription continuously decodes all common traffic channel (CTCH) occasions until a broadcast multicast control (BMC) scheduling message (SM) is read. Subsequently, the subscription wakes up at specific occasions to read required CBS messages based on scheduling pattern learned from the SM. In a WCDMA+WCDMA dual subscriber identity module (SIM), dual standby (DSDS) mobile communication device. CBS message reception is supported only by a single subscription. Supporting CBS message reception by only a single subscription litigates degradation in throughput of a subscription on a packet switched (PS) call and reduces battery discharge observed when both subscriptions support CBS messages.

SUMMARY

Apparatuses and methods for selecting a subscription for CBS message reception are provided.

According to various embodiments there is provided a method for selecting a subscription to receive cell broadcast service (CBS) messages for a multi-subscriber identity module (SIM) mobile communication device. In some embodiments, the method may include; camping on a first communication network with a first subscription; camping on a second communication network with a second subscription; determining whether system information blocks (SIBs) received on the first subscription and the second subscription contain information elements including one or more parameters that define a broadcast multicast control (BMC) scheduling message (SM) period; in response to determining that the SIBs received on at least one of the first subscription and the second subscription contain the information elements including the one or more parameters defining the BMC SM period, selecting the one of the first subscription and the second subscription associated with the SIBs containing the information elements to receive the CBS messages.

According to various embodiments there is provided a multi-subscriber identity module (SIM) mobile communication device. In some embodiments, the multi-subscriber identity module (SIM) mobile communication device may include: a communication unit configured to communicate with a plurality of communication networks using a plurality of radio access technologies (RATs); and a control unit.

The control unit may be configured to: cause the communication unit to camp on a first communication network with a first subscription; cause the communication unit to camp on a second communication network with a second subscription; cause the cormnunication unit to receive system information blocks (SIBs) on the first subscription and the second subscription; determine whether the SIBs received by the communication unit on the first subscription and the second subscription contain information elements including one or more parameters that define a broadcast multicast control (BMC) scheduling message (SM) period; and in response to determining that the SIBs received by the communication unit on at least one of the first subscription and the second subscription contain the information elements including the one or more parameters defining the BMC SM period, select the one of the first subscription and the second subscription associated with the SIBs containing the information elements to receive the CBS messages.

According to various embodiments there is provided a non-transitory computer readable medium . In some embodiments, the non-transitory computer readable medium may have stored therein a program for causing one or more processors to execute a method for selecting a subscription to receive cell broadcast service (CBS) messages for a multi-subscriber identity module (SIM) mobile communication device, the program including processor executable instructions for performing operations including: camping on a first communication network with a first subscription; camping on a second communication network with a second subscription; determining whether system information blocks (SIBs) received on the first subscription and the second subscription contain information elements including one or more parameters that define a broadcast multicast control (BMC) scheduling message (SM) period; in response to determining that the SIBs received on at least one of the first subscription and the second subscription contain the information elements including the one or more parameters defining the BMC SM period, selecting the one of the first subscription and the second subscription associated with the SIBs containing the information elements to receive the CBS messages.

According to various embodiments there is provided a multi-subscriber identity module (SIM) mobile communication device. In some embodiments, the multi-subscriber identity module (SIM) mobile communication device may include: means for communicating with a plurality of communication networks using a plurality of radio access technologies (RATs); means for camping on a first communication network with a first subscription; means for camping on a second communication network with a second subscription; means for receiving system information blocks (SIBs) on the first subscription and the second subscription; means for determining whether the SIBs received on the first subscription and the second subscription contain information elements including one or More parameters that define a broadcast multicast control (BMC) scheduling message (SM) period; in response to determining that the SIBs received on at least one of the first subscription and the second subscription contain the information elements including the one or more parameters defining the BMC SM period, means for selecting the one of the first subscription and the second subscription associated with the SIBs containing the information elements to receive the CBS messages.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
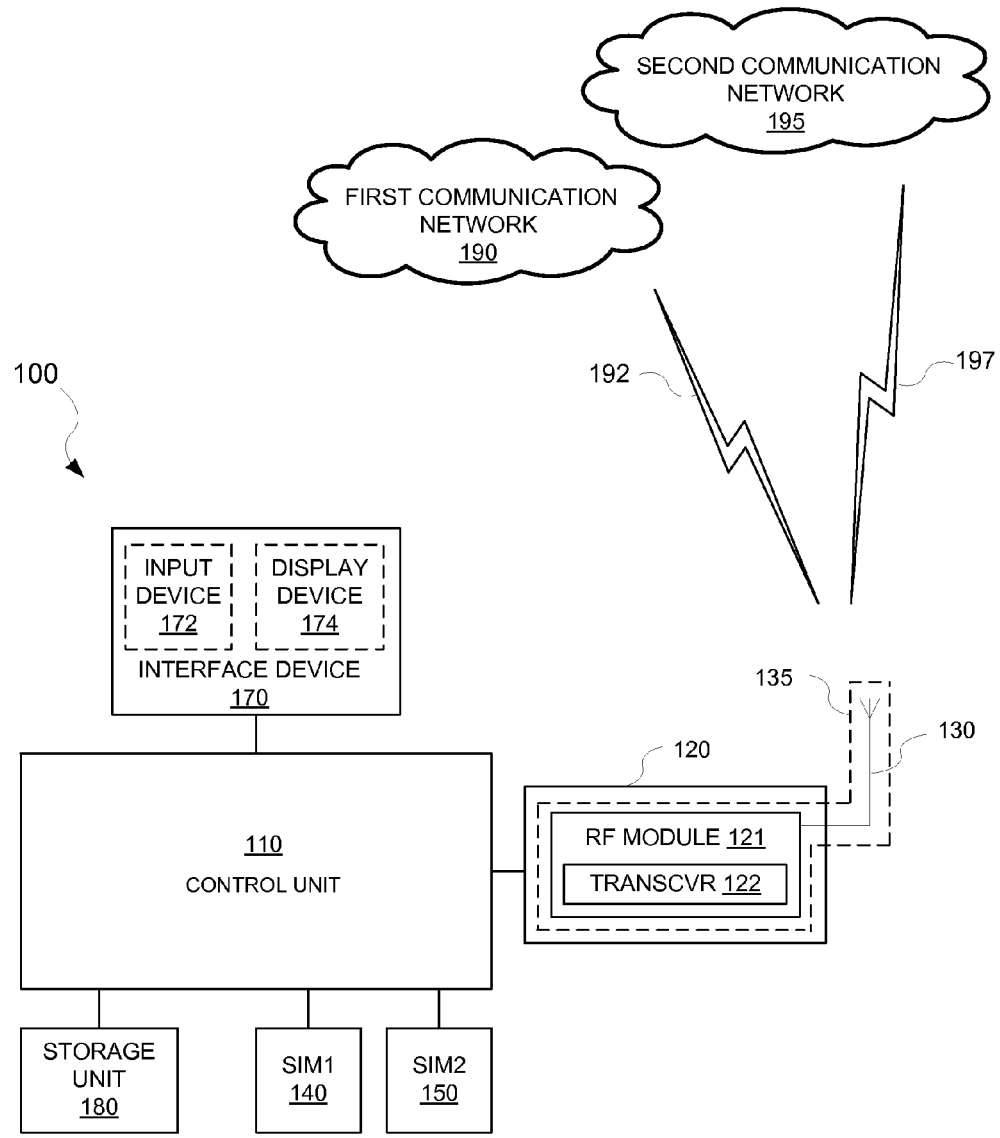
FIG. 1A is a block diagram illustrating a mobile communication device according to various embodiments.

FIG. 1A is a block diagram illustrating a mobile communication device 100 according to various embodiments. As illustrated in FIG, 1A, the mobile communication device 100 may include a control unit 110, a communication unit 120, an antenna 130, a first SIM 140, a second SIM 150, a user interface device 170, and a storage unit 180.

The mobile communication device 100 may be, for example but not limited to, a mobile telephone, smartphone, tablet, computer, etc., capable of communications with one or more wireless communication networks. One of ordinary skill in the art will appreciate that the mobile communication device 100 may include one or more transceivers (communication units) and may interface with one or more antennas without departing from the scope of the present inventive concept.

The communication unit 120 may include, for example but not limited to, a radio frequency (EF) module 121. The RF module 121 may include, for example, but not limited to the first transceiver 122, An RE chain 135 may include, for example, but not limited to the antenna 130 and the RE module 121.

One of ordinary skill in the art will appreciate that embodiments of the mobile communication device 100 may include more than one communication unit and/or more than one antenna without departing from the scope of the present inventive concept.

A SIM (for example the first SIM 140 and/or the second SIM 150) in various embodiments may be a universal integrated circuit card (UICC) that is configured with SIM and or universal SIM (USIM) applications, enabling access to global system for mobile communications (GSM) and/or universal mobile telecommunications system (UMTS) networks. The UICC may also provide storage for a phone book and other applications. Alternatively, in a code division multiple access (CDMA) network, a SEM may be a LAT: removable user identity module (R-UIM) or a CDMA subscriber identity module (CSIM) on a card. A SIM card may have a CPU, ROM, RAM, EEPROM and I/O circuits. An integrated circuit card identity (ICCID) SIM serial number may be printed on the SIM card for identification. However, a SIM may be implemented within a portion of memory of the mobile communication device 100, and thus need not be a separate or removable circuit, chip, or card.

A SIM used in various embodiments may store user account information, an international mobile subscriber identity (IMSI), a set of SIM application toolkit (SAT) commands, and other network provisioning information, as well as provide storage space for phone book database of the user's contacts. As part of the network provisioning information, a SIM may store home identifiers (e.g., a system identification number (SID)/network identification number (NID) pair, a home public land mobile network (HPLMN) code, etc.) to indicate the SIM card network operator provider.

The first SIM 140 may associate the communication unit 120 with a first subscription (Sub1) 192 associated with a first radio access technology (RAT) on a first communication network 190 and the second SIM 150 may associate the communication unit 120 with a second subscription (Sub2) 197 associated with a second RAT on a second communication network 195. When a RAT is active, the communication unit 120 receives and transmits signals on the active RAT. When a RAT is idle, the communication unit 120 receives but does not transmit signals on the idle RAT.

For convenience, the various embodiments are described in terms of DSDS mobile communication devices. However, one of ordinary skill in the art will appreciate that the present inventive concept may be extended to Multi-SIM Multi-Standby (MSIVIS) and/or Multi-SIM Multi-Active (MSMA) mobile communication devices without departing from the scope of protection.

The first communication network 190 and the second communication network 195 may be operated by the same or different service providers, and/or may support the same or different RATs, for example, but not limited to, GSM, CDMA, WCDMA, and LTE.

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the communication unit 120, the user interface device 170, and the storage unit 180. The control unit 110 may be a programmable device, for example, but not limited to, a microprocessor (e.g., general-purpose processor, baseband modem processor, etc.) or microcontroller.

The storage unit 180 may be configured to store operating systems and/or application programs for operation of the mobile communication device 100 that are executed by the control unit 110, as well as to store application data and user data.

Figure 1B:
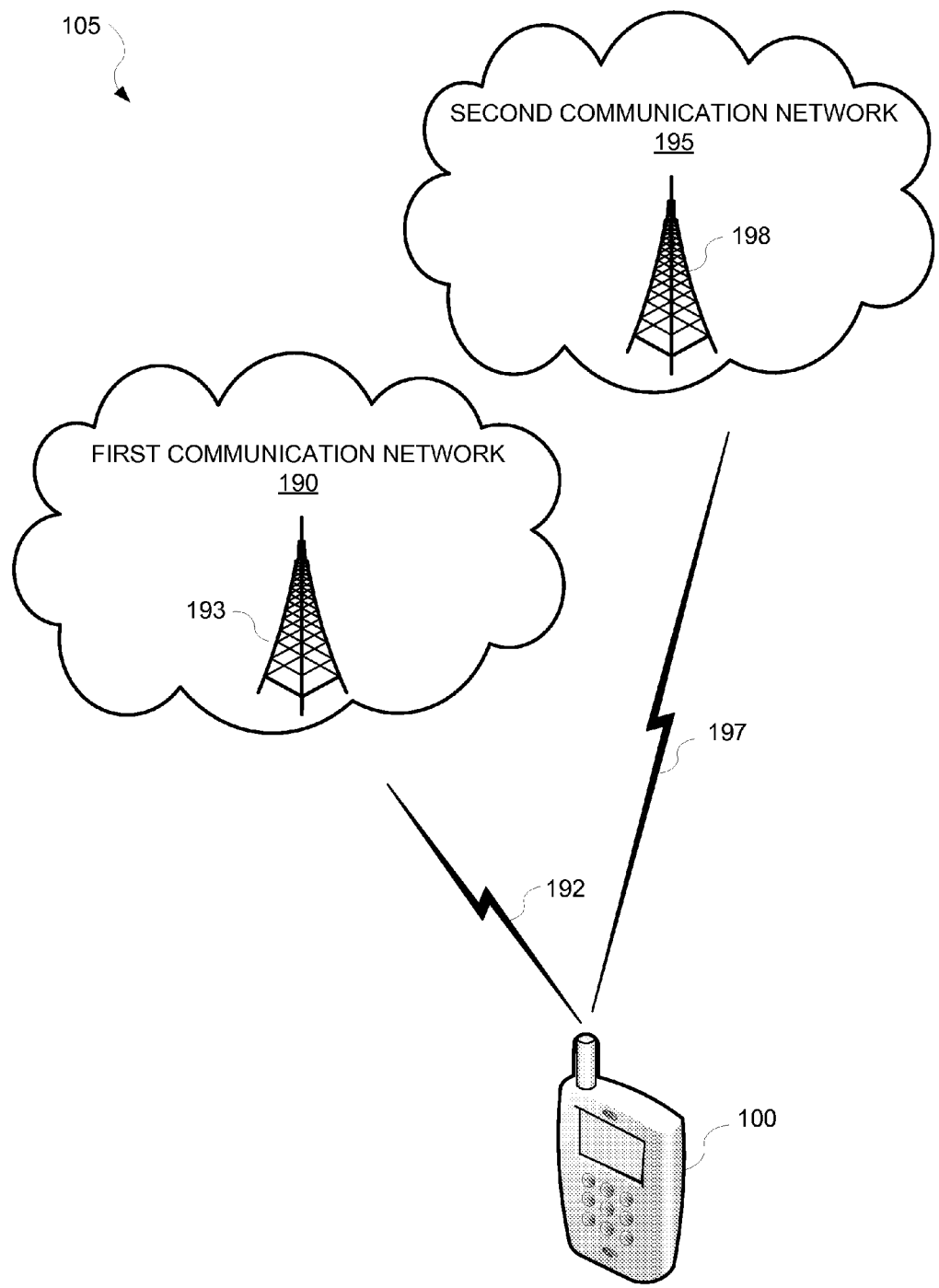
FIG. 1B is a diagram illustrating a network etwirontnent for various embodiments.

FIG. 1B is a diagram illustrating a network environment 105 for various embodiments. Referring to FIGS. 1A and 1B, the mobile communication device 100 may be configured to communicate with a first communication network 190 on a first subscription 192 and a second communication network 195 on a second subscription 197. One of ordinary skill in the art will appreciate that the mobile communication device may configured to communicate with more than two communication networks and may communicate on more than two subscriptions without departing from the scope of the inventive concept.

The first communication network 190 and the second communication network 195 may implement the same or different radio access technologies (RATs). For example, the first communication network 190 may be a GSM network and the first subscription 192 may be a GSM subscription. The second communication network 195 may also be a GSM network. Alternatively, the second communication network 195 may implement another RAT including, for example, but not limited to, Long Term Evolution (LTE), Wideband Code Division Multiple Access (WCDMA), and Time Division-Synchronous Code Division Multiple Access (TD-SCDMA).

The first communication network 190 may include one or more base transceiver stations (BTSs) including, for example, but not limited to, a first BTS 193. The second communication network 195 may also include one or more BTSs, including, for example, but not limited to, a second BTS 198. A person having ordinary skill in the art will appreciate that the network environment 105 may include any number of communication networks, mobile communication devices, and BTSs without departing from the scope of the present inventive concept.

The mobile communication device 100 may attempt to acquire the first communication network 190 and camp on the first BTS 193. The mobile communication device 100 may also attempt to acquire the second communication network 195 and camp on the second BTS 198. A person having ordinary skill the art will appreciate that the acquisition of the first communication network 190 performed on the first subscription 192 may be independent of the acquisition of the second communication network 195 performed on the second subscription 197. Furthermore, the mobile communication device 100 may attempt to acquire the first communication network 190 on the first subscription 192 and the second communication network 195 on the second subscription 197.

CBS messages may be transmitted during CTCH occasions based on scheduling pattern learned from the SM. The CTCH occasions may be determined by a set of parameters that may be transmitted by a BTS (e.g., the BTS 193 or the BTS 198) in system information block (SIB) type 5 or 5 bis (i.e., SIB 5 or SIB 5 bis). The CTCH occasions that contain the start of the BMC SMs may be calculated as follows: SEN=(K+m P N), where SEN is a system frame number ranging from 0 to MaxSFN with MaxSFN being a maximum system frame number (i.e., and 0≤SFN≤MaxSFN), K is a CBS frame offset in is an integer, P is a period of the BMC SMs, and N is an integer number of radio frames corresponding to a period of CTCH allocation on the secondary common control physical channel (S-CCPCH).

If a "Period of BMC scheduling messages (P)" information element is included in SIB 5 or 5 bis, then BMC SMs may be transmitted periodically every P CTCH occasions. One BMC SM may be segmented across more than one CTCH occasion. If the "Period of BMC scheduling messages (P)" information element is not included in the SIB 5 or SIB 5 bis, then BMC SMs may be transmitted in any CTCH occasion. Various embodiments may choose a subscription that has information regarding the period of BMC scheduling messages (i.e., the parameter P from SIB5 or SIB 5 bis) for receiving CBS messages.

Figure 2:
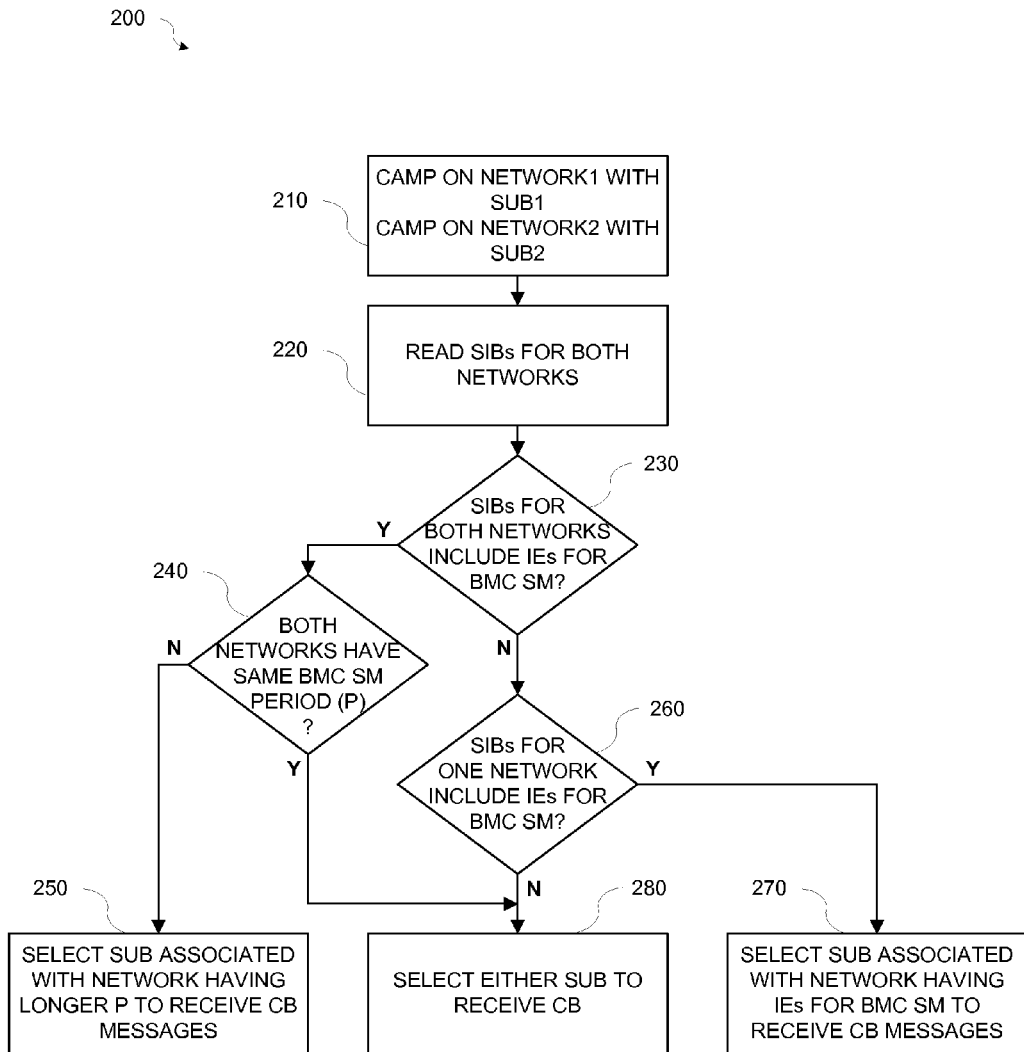
FIG. 2 is a flowchart illustrating a method for selecting a subscription for cell broadcast service (CBS) message reception according to various embodiments.

Referring to FIGS. 1A-2, the control unit 110 may be configured to cause the communication unit 120 to receive SIB 5 or SIB 5 bis from a first BTS (e.g., the first BTS 193) on a first subscription (e.g., Sub1 192) associated with a first communication network (e.g., the first communication network 190). The control unit 110 may also be configured to cause the communication unit 120 to receive SIB 5 or SIB 5 bis from a second BTS (e.g., the second BTS 198) on a second subscription (e.g., Sub2 197) associated with a second communication network (e.g., the second communication network 195).

The SIB5 or SIB5bis received by the communication unit 120 from each communication network may include the parameters P, K, and N. If the control unit 110 determines that the parameters P, K, and N are received by the communication unit 120 on both Sub1 192 from the first communication network 190 and Sub2 197 from the second communication network 195, the control unit 110 may select the subscription having the largest BMC scheduling message period, P, as the subscription on which to receive CBS messages. With knowledge of the parameters P, K, and N, the control unit 110 may cause the selected subscription to only wake up to decode the header of the SM only at SFN=(K+m P N), rather than waking up to decode every CTCH occasion. Thus, receiving CBS messages on the subscription having the largest P may result in fewer wake ups for the corresponding subscription.

On the other hand, if the control unit 110 determines that the BMC scheduling message period, P, has a same duration for both subscriptions, the control unit 110 may select either subscription as the subscription on which to receive CBS messages. For example, the control unit 110 may default to a legacy process for selecting a subscription on which to receive CBS messages.

However, not all communication networks may support DRX for CBS messages, and not all communication networks may not broadcast the parameters P, K, and N in SIB5 or SIB5bis. If the control unit 110 determines that the parameters P, K, and N are received by the communication unit 120 in SIB 5 or SIB 5bis on only one subscription (e.g., Sub1 192 from with the first communication network 190), the control unit 110 may select the subscription that received the parameters P, K, and N (e.g., Sub1 192) as the subscription on which to receive CBS messages.

With knowledge of the parameters P, K, and N, the control unit 110 may cause the selected subscription to only wake up to decode the header of SM only at SFN =(K+m P N), and need not decode every CTCH occasion. Receiving CBS messages on the subscription that received the parameters P, K, and N may result in fewer wake-ups for the corresponding subscription since the control unit 110 may wake up the subscription based on the BMC scheduling message period, P.

If the control unit 110 determines that the parameters P, K, and N are not received by the communication unit 120 in SIB 5 or SIB 5 bis from either subscription (e.g., Sub1 192 associated with the first communication network 190 and Sub2 197 associated with the second communication network 195), the control unit 110 may select either subscription as the subscription on which to receive CBS messages. For example, the control unit 110 may default to a legacy selection process for selecting a subscription on which to receive CBS messages.

FIG. 2 is a flowchart illustrating a method 200 for selecting a subscription for cell broadcast service (CBS) message reception according to various embodiments. Referring to FIGS. 1A-2, at block 210, a first subscription (e.g., Sub1 192) may camp on a first communication network (e.g., the first communication network 190), and a second subscription (e.g., Sub2 197) may camp on a second communication network (e.g., the second communication network 195). At block 220, the control unit 110 may cause the communication unit 120 to read SIB 5 or SIB 5 bis received from the first communication network 190 on Sub1 192 and to read SIB 5 or SIB 5 bis received from the second communication network 195 on Sub2 197.

At block 230, the control unit 110 may determine whether the SIB5 or SIB 5 bis is received on Sub1 192 associated with the first communication network 190 and Sub2 197 associated with the second communication network 195 include information elements (IEs) containing the parameters P, K, and N.

In response to determining that the information elements containing the parameters P, K, and N are included in the SIB5 or SIB5 bis received on both subscriptions from both communication networks, respectively (230-Y), the control unit 110 may determine whether the BMC scheduling message period, P, has a same duration for both subscriptions at block 240. In response to determining that the BMC scheduling message period, P, does not have the same duration for both subscriptions (240-N), at block 250, the control unit 110 may select the subscription (e.g., Sub1 192) having the longer duration BMC scheduling message period, P (i.e. a larger P) as the subscription on which to receive CBS messages.

In response to determining that the BMC scheduling message period, P. has the same duration for both subscriptions (240-Y), at block 280, the control unit 110 may select either subscription as the subscription on which to receive CBS messages. For example, the control unit 110 may default to a legacy process for selecting a subscription on which to receive CBS messages.

In response to determining that the information elements containing the parameters P, K, and N are not included in the SIB5 Of SIB5 bis received on both subscriptions from both communication networks, respectively (230-N), at block 260, the control unit 110 may determine whether the information elements containing the parameters P, K, and N are included in the SIB 5 or SIB 5 bis received on at least one subscription (e.g., Sub1) associated with one of the communication networks (e.g., the first communication network 190).

In response to determining that the information elements containing the parameters P, K, and N are included in the SIB 5 or SIB 5 bis received on the at least one subscription (e.g., Sub1) associated with the one communication network (e.g., the first communication 190) (260-Y), at block 270, the control unit 110 may select the subscription (e.g., Sub1 192) associated with the communication network having information elements for the BMC SMs (e.g., the first communication 190) as the subscription on which to receive CBS messages.

In response to determining that the information elements containing the parameters P, K, and N are not included in the SIB5 or SIB5 bis received on the at least one subscription (e.g., Sub1 192) associated with the one communication network (e.g., the first communication 190) (260-N), at block 280, the control unit 110 may select either subscription as the subscription on which to receive CBS messages. For example, the control unit 110 may default to a legacy process for selecting a subscription on which to receive CBS messages.

The method 200 may be repeated each time the mobile communication device 100 experiences a change of state, for example, but not limited to, when the mobile communication device 100 camps on a communication network, performs cell reselection, transitions from a connected state to an idle state, etc.

The method 200 may be embodied on a non-transitory computer readable medium, for example, but not limited to, the storage 180 or other non-transitory computer readable medium known to those of skill in the art, having stored therein a program including computer executable instructions for making a processor, computer, or other programmable device execute the operations of the methods.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The accompanying claims and their equivalents are intended to cover such forms of modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor. ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for selecting a subscription to receive cell broadcast service (CBS) messages for a multi-subscriber identity module (SIM) mobile communication device, the method comprising:
    camping on a first communication network with a first subscription;
    camping on a second communication network with a second subscription;
    determining whether system information blocks (SIBs) received on the first subscription and the second subscription contain information elements including one or more parameters that define a broadcast multicast control (BMC) scheduling message (SM) period;
    in response to determining that the SIBs received on at least one of the first subscription and the second subscription contain the information elements including the one or more parameters defining the BMC SM period, selecting the one of the first subscription and the second subscription associated with the SIBs containing the information elements to receive the CBS messages;
    determining whether one of the first subscription and the second subscription have a same BMC SM period; and
    in response to determining that one of the first subscription and the second subscription has a longer BMC SM period, selecting the one of the first subscription and the second subscription associated with the SIBs having the longer BMC SM period to receive the CBS messages.

2. The method of claim 1, wherein
    in response to determining that the first subscription and the second subscription have a same BMC SM period, selecting one of the first subscription and the second subscription to receive the CBS messages using a legacy selection process.

3. The method of claim 1, wherein the one or more parameters defining the BMC SM period comprise one or more of a period of BMC scheduling messages and a CBS frame offset.

4. A multi-subscriber identity module (SIM) mobile communication device, comprising:
    a communication unit configured to communicate with a plurality of communication networks using a plurality of radio access technologies (RATs); and
    a control unit configured to:
    cause the communication unit to camp on a first communication network with a first subscription;
    cause the communication unit to camp on a second communication network with a second subscription;
    cause the communication unit to receive system information blocks (SIBs) on the first subscription and the second subscription;
    determine whether the SIBs received by the communication unit on the first subscription and the second subscription contain information elements including one or more parameters that define a broadcast multicast control (BMC) scheduling message (SM) period;
    in response to determining that the SIBs received by the communication unit on at least one of the first subscription and the second subscription contain the information elements including the one or more parameters defining the BMC SM period, select the one of the first subscription and the second subscription associated with the SIBs containing the information elements to receive the CBS messages,
    wherein the control unit is configured to determine whether one of the first subscription and the second subscription have a same BMC SM period, and
    in response to determining that one of the first subscription and the second subscription has a longer BMC SM period, the control unit is further configured to select the one of the first subscription and the second subscription associated with the SIBs having the longer BMC SM period to receive the CBS messages.

5. The mobile communication device of claim 4, wherein
    in response to determining that the first subscription and the second subscription have a same BMC SM period, the control unit is further configured to select one of the first subscription and the second subscription to receive the CBS messages using a legacy selection process.

6. The mobile communication device of claim 4, wherein the one or more parameters defining the BMC SM period contained in the SIBs received by the communication unit comprise one or more of a period of BMC scheduling messages and a CBS frame offset.

7. A non-transitory computer readable medium having stored therein a program for causing one or more processors to execute a method for selecting a subscription to receive cell broadcast service (CBS) messages for a multi-subscriber identity module (SIM) mobile communication device, the program including processor executable instructions for performing operations comprising:
    camping on a first communication network with a first subscription;
    camping on a second communication network with a second subscription;

determining whether system information blocks (SIBs) received on the first subscription and the second subscription contain information elements including one or more parameters that define a broadcast multicast control (BMC) scheduling message (SM) period;

in response to determining that the SIBs received on at least one of the first subscription and the second subscription contain the information elements including the one or more parameters defining the BMC SM period, selecting the one of the first subscription and the second subscription associated with the SIBs containing the information elements to receive the CBS messages;

determining whether one of the first subscription and the second subscription have a same BMC SM period, and in response to determining that one of the first subscription and the second subscription has a longer BMC SM period, selecting the one of the first subscription and the second subscription associated with the SIBs having the longer BMC SM period to receive the CBS messages.

8. The non-transitory computer readable medium having stored therein a program as defined in claim 7, the program further comprising processor executable instructions to perform operations comprising:

in response to determining that the first subscription and the second subscription have a same BMC SM period, selecting one of the first subscription and the second subscription to receive the CBS messages using a legacy selection process.

9. The non-transitory computer readable medium having stored therein a program as defined in claim 7, wherein the one or more parameters defining the BMC SM period comprise one or more of a period of BMC scheduling messages and a CBS frame offset.

10. A multi-subscriber identity module (SIM) mobile communication device, comprising:

means for communicating with a plurality of communication networks using a plurality of radio access technologies (RATs);

means for camping on a first communication network with a first subscription;

means for camping on a second communication network with a second subscription;

means for receiving system information blocks (SIBs) on the first subscription and the second subscription;

means for determining whether the SIBs received on the first subscription and the second subscription contain information elements including one or more parameters that define a broadcast multicast control (BMC) scheduling message (SM) period;

in response to determining that the SIBs received on at least one of the first subscription and the second subscription contain the information elements including the one or more parameters defining the BMC SM period, means for selecting the one of the first subscription and the second subscription associated with the SIBs containing the information elements to receive the CBS messages;

means for determining whether one of the first subscription and the second subscription have a same BMC SM period; and in response to determining that one of the first subscription and the second subscription has a longer BMC SM period, means for selecting the one of the first subscription and the second subscription associated with the SIBs having the longer BMC SM period to receive the CBS messages.

11. The mobile communication device of claim 10, further comprising:

in response to determining that the first subscription and the second subscription have a same BMC SM period, means for selecting one of the first subscription and the second subscription to receive the CBS messages using a legacy selection process.

12. The mobile communication device of claim 10, wherein the one or more parameters defining the BMC SM period comprise one or more of a period of BMC scheduling messages and a CBS frame offset.

\* \* \* \* \*